US009801096B2

(12) United States Patent
Pirilä et al.

(10) Patent No.: US 9,801,096 B2
(45) Date of Patent: Oct. 24, 2017

(54) GENERIC SERVICE REQUEST PROCEDURE IN A MULTIMODE SYSTEM

(75) Inventors: Hannu Pirilä, Littoinen (FI); Harri Jokinen, Pertteli (FI); Kari Pihl, Raisio (FI)

(73) Assignee: Conversant Wireless Licesing S.A.R.L., Luxembourg (LU)

( * ) Notice: Subject to any disclaimer, the term of this patent is extended or adjusted under 35 U.S.C. 154(b) by 1541 days.

(21) Appl. No.: 10/563,545

(22) PCT Filed: Jul. 6, 2004

(86) PCT No.: PCT/FI2004/000427
§ 371 (c)(1),
(2), (4) Date: Feb. 15, 2007

(87) PCT Pub. No.: WO2005/004507
PCT Pub. Date: Jan. 13, 2005

(65) Prior Publication Data
US 2007/0237126 A1  Oct. 11, 2007

Related U.S. Application Data

(60) Provisional application No. 60/485,609, filed on Jul. 7, 2003.

(51) Int. Cl.
*H04W 28/24* (2009.01)
*H04W 8/24* (2009.01)
*H04W 36/14* (2009.01)
*H04W 48/18* (2009.01)
*H04W 88/06* (2009.01)

(52) U.S. Cl.
CPC ........... *H04W 28/24* (2013.01); *H04W 8/245* (2013.01); *H04W 36/14* (2013.01); *H04W 48/18* (2013.01); *H04W 88/06* (2013.01)

(58) Field of Classification Search
USPC ........................................ 455/552, 433, 437
See application file for complete search history.

(56) References Cited

U.S. PATENT DOCUMENTS 5,267,244 A     11/1993  Messerschmitt et al. ... 370/95.3
5,594,782 A  *   1/1997  Zicker et al. ................. 455/417
(Continued)

FOREIGN PATENT DOCUMENTS

EP     0716797       3/1997
EP     1076463 A2 *  2/2001  ............... H04Q 3/00
(Continued)

OTHER PUBLICATIONS

European Office Action for EP Application Serial No. 04742170.6 dated Apr. 12, 2007.

*Primary Examiner* — Steven Kelley
(74) *Attorney, Agent, or Firm* — Core Wireless Licensing Ltd.

(57) ABSTRACT

Generic service request signalling is defined where a multimode terminal is allowed to request any service that it supports in any of the modes (e.g., access technology like GERAN/UTRAN/CDMA2000/BlueTooth/WLAN/ . . . ) supported by the terminal. The network may then decide to move the terminal to other system if possible and necessary in order to establish the service. Mostly existing terminal capability indication for each system mode is used.

13 Claims, 2 Drawing Sheets

(56) References Cited

U.S. PATENT DOCUMENTS

| | | | |
|---|---|---|---|
| 6,125,283 A * | 9/2000 | Kolev et al. | 455/552.1 |
| 6,377,804 B1 * | 4/2002 | Lintulampi | H04W 60/00 |
| | | | 455/426.1 |
| 6,615,042 B1 * | 9/2003 | Britt et al. | 455/433 |
| 6,748,246 B1 * | 6/2004 | Khullar | 455/574 |
| 7,089,008 B1 * | 8/2006 | Back et al. | 455/437 |
| 2001/0009544 A1 * | 7/2001 | Vanttinen et al. | 370/338 |
| 2002/0045447 A1 * | 4/2002 | Rasanen | 455/436 |
| 2002/0085540 A1 * | 7/2002 | Hyvarinen et al. | 370/352 |
| 2003/0114158 A1 * | 6/2003 | Soderbacka et al. | 455/436 |

FOREIGN PATENT DOCUMENTS

| | | |
|---|---|---|
| EP | 1134674 | 9/2001 |
| FI | 105309 | 12/1998 |
| WO | 98/53626 A | 11/1998 |
| WO | WO 98/53626 | 11/1998 |
| WO | 87/59513 A | 12/1998 |
| WO | WO 98/59513 | 12/1998 |
| WO | WO 00/07401 | 2/2000 |
| WO | WO 03/053091 | 6/2003 |

\* cited by examiner

GENERIC SERVICE REQUEST PROCEDURE IN A MULTIMODE SYSTEM

CROSS REFERENCE TO RELATED APPLICATIONS

This application is the U.S. National Stage of International Application PCT/FI2004/000427 filed Jul. 6, 2004, and published on Jan. 13, 2005, under International Publication Number WO 2005/004507 A1, and claims priority from U.S. Provisional Patent Application No. 60/485,609 filed Jul. 7, 2003.

BACKGROUND OF THE INVENTION

1. Technical Field

The present invention relates to telecommunications and, more particularly, to mobile telecommunications terminals and utilization of network services.

2. Discussion of Related Art

Multimode terminals are getting more and more popular. Multimode terminals are capable of operating on different system modes (using different radio access technologies and/or able to attach to different core networks). Examples of different system modes are GERAN, WCDMA, TDMA, AMPS, CDM 2000, WLAN, Bluetooth etc. Multimode networks may support different types of interworking between the system modes supported by the terminal.

Currently the terminal already provides some information about its capability in different system modes, making the network aware which services the terminal can support in different system modes. An example is a GERAN terminal indicating its capabilities; in addition to the capabilities for GERAN access technology, also if it supports WCDMA and/or CDM 2000 radio access technologies. The terminal may have quite different support for services depending on the serving system mode. For example, simultaneous packet and circuit switched service is only possible if both the GERAN network and terminal support dual transfer mode (DTM) while this service is always supported by a GERAN/UTRAN dual mode terminal when served by UTRAN. Similarly, if the GERAN network does not support high speed data, then the circuit switched data rate is limited to 9.6 kbit/s for GERAN access while a higher data rate is likely available through WCDMA and an even higher data rate through WLAN. GERAN again might support a location service when any of the other modes supported by the multimode terminal do not support this service. However, when the terminal requests a service, the request is limited to the services supported by the terminal in the currently serving system mode, additional restrictions may be set if the network indicates non-support for some specific network capabilities.

In 3GPP standardisation, different vendors are proposing different ways to solve specific problems where GERAN capabilities are not enough to support a service and thus inter-system change from GERAN to UTRAN is proposed. For example, 3GPP TSG-SA WG1 #21 (Sophia Antipolis, France Jun. 7-11, 2003) proposes to allow a UE that has CS multimedia capability and that is camping on a GERAN cell but is also within UTRAN coverage to setup a CS multimedia service using a UDI 64 kbit/s bearer in UTRAN. Another example is 3GPP TSG-SA2 #33 (also Jun. 7-11, 2003) which introduces a proposal for a new procedure for dual CN connection where a UMTS/GSM terminal roaming in GSM in the neighbourhood of UTRAN coverage is allowed to request a dual CN connection to the BSS, even if the MS is not Class A or if DTM is not supported by the MS and/or the BSS, in order to indicate that a handover or a cell change order to UTRAN should be favoured by the BSS.

Currently there already exist other similar problem cases for other services as well, and the above mentioned proposed solutions by different vendors are not applicable for solving the problems for these other cases but are only directed to narrow and particular problems. The difficulty in these solutions is that they are targeted to a specific problem and are not suitable for solving the issue in generic way (though, these proposals are not actually acceptable to solve the mentioned problems). In this invention disclosure it is shown that a generic mechanism should be applied into the 3GPP specifications to solve the problem in a generic way.

A further example solution is given in the EPO patent No 0716797B1 where the mobile station utilises service specific PLMN preference lists and where the mobile station then selects the PLMN according to the corresponding preference list for the service requested by the user.

Still another example is given in the Finnish patent FI 105309B where the mobile station is aware of the different services supported by different available PLMNs and where the mobile stations selects the PLMN according to the requested service.

Still another example is given in the US patent application 2003/0114158A1 where terminal either directly or indirectly requests intersystem handover in order to establish the requested service. In this patent the preference list in either terminal or network is needed in order to tie the specific service to the specific system.

The disadvantage of these solutions is that the mobile station awareness of the services available from different PLMNs cannot be easily arranged. Also the support of services by different PLMNs may not only depend on the capabilities of the PLMN but also e.g. on the load of the networks and then the support of a specific service may be time dependent. Also the service availability may be location dependent e.g. as a function of the capabilities of the serving cell. Also the disadvantage is the need to have service/content based preference lists either in terminal or in network. Furthermore the optimum PLMN cannot be selected for mobile terminated services in which case the mobile station would not be aware of the service in advance and then cannot select the appropriate PLMN in advance and the service request would be rejected already by the PLMN where the mobile station is attached at the time of the service establishment attempt. Hence the prior art does not provide a solution for a fully flexible service request in respect to the terminal and the network capabilities in different modes.

DISCLOSURE OF INVENTION

Figure 1:
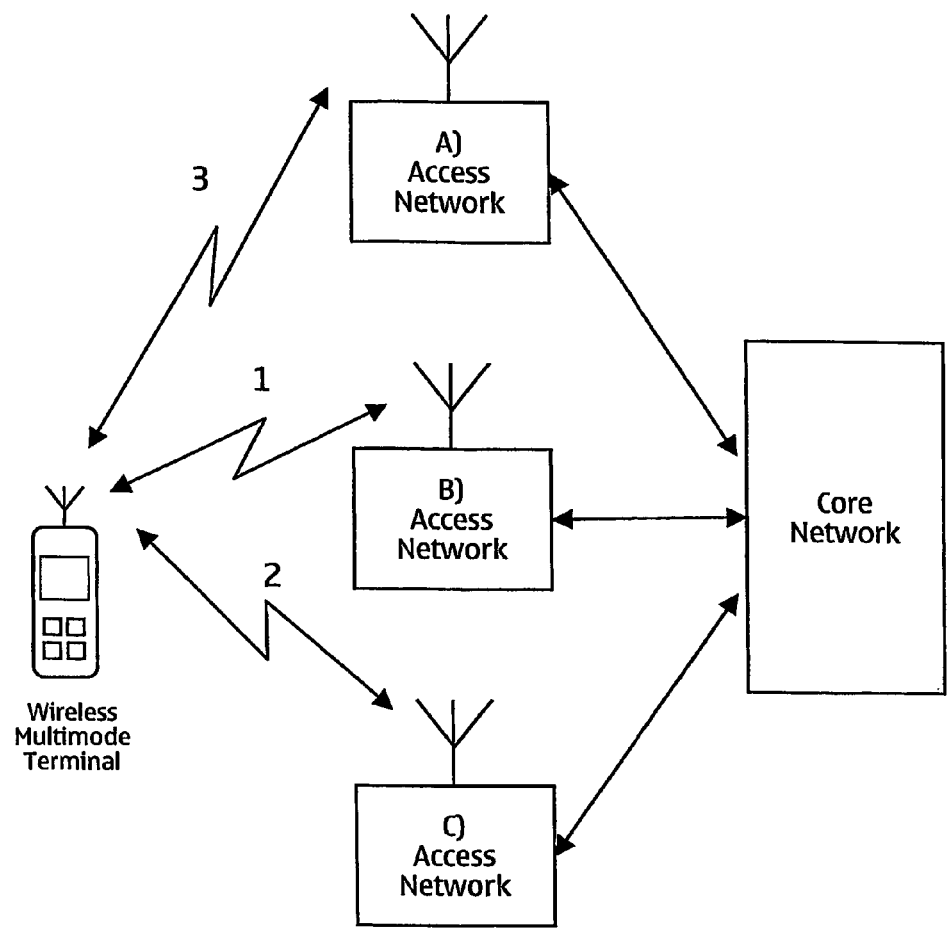
FIG. 1 shows a multimode system consisting of a multimode terminal, a number of multimode radio access networks and at least one core network.

The generic problem solved is the generic case where a multimode terminal is served by one system and the terminal supports a service that is not supported by the serving system, but likely would be supported by another system (supported by the multimode terminal with the other system's coverage available). For example, currently a GERAN/UTRAN dual mode terminal cannot request a specific service that it supports only in the UTRAN mode, when it is served by a GERAN network.

The invention is that a generic service request signalling is defined where a multimode terminal is allowed to request any service that it supports in any of the modes (e.g., access technology like GERAN/UTRAN/CDMA2000/BlueTooth/WLAN/ . . . ) supported by the terminal. The network may then decide to move the terminal to other system if possible and necessary in order to establish the service. The terminal capability indication for each system mode mostly exists already.

It should be mentioned that it would be advantageous for the network to indicate support for the generic service request signalling so that terminal would not send these requests in case the serving network would not support it.

The advantages of the invention are that terminal could start the service regardless the serving system capabilities and the full control is left to the network.

The terminal would not need to scan the available modes and reselect the system that supports requested service.

BEST MODE FOR CARRYING OUT THE INVENTION

1. Making service request independent from the serving system mode Since a multimode terminal may support a wide range of services where some specific services are not supported by the mobile in all system modes and some specific services may not be requested from the serving system, it is possible that the terminal (user) does not reach the service it would be able to support, and a service that would be available at the current terminal location through other system modes.

This problem can be solved by a generic service request procedure that allows the terminal to request any of the services it supports, in any of the system modes it supports, through the current serving system.

This generic service request can be implemented in several different ways. Normally the network should indicate support for generic service requests in order to avoid compatibility problems for new terminals in legacy networks. In case a generic service request is allowed, the terminal may:

Use existing signalling messages defined for the serving system, but with service request parameters that exceed the terminal capabilities in the serving system mode. An example being 64 kbit/s circuit switched data that is supported by GERAN but may not be supported by the terminal in GERAN mode. Then the multimode terminal may be allowed to request 64 kbit/s data when served by a GERAN network (FIG. 1 & FIG. 2, for example A=GERAN, B=UTRAN), even if it does not support this service through GERAN. The network may then decide to hand over the dual mode terminal to be served by the UTRAN system (when UTRAN coverage and capacity is available locally), and the requested service may then be established through UTRAN. Alternatively the network may deny this service and the network may then negotiate a service on the currently service system that would be supported both by the terminal and network and would be considered acceptable by the terminal.

A specific signalling container may be built allowing the serving network to direct the terminal service request to one or more other systems. Optionally an identifier is added to each service request so that the serving system is able to direct each particular service request container only to the corresponding system. Alternatively, all parallel service request containers are sent to each other systems and the other systems identify which container carries a service request for itself. In this case it is sufficient that the terminal builds the service request in a way that is understood by each of the other systems for which the request shall be intended. The serving system then does not need to understand in detail any of the terminal capabilities on other systems, it is sufficient that the service request is transferred to the other system and interpreted locally. If the other system is able to serve terminal with the requested service, the terminal would be moved to be served by this system and the requested service would be established there. One potential solution would be that the target system responds with a handover command or a network controlled cell reselection order that makes the terminal to move to the desired system.

The serving system capability may be extended so that it is able to decode also service requests for services that are not supported by it (not supported at all by the system mode of the serving system or just not implemented by the serving system). This allows a first decision locally by the serving system on the terminal service request. The serving system may initiate a handover request (or similar) towards another system or it may directly decide to offer an alternative service that is supported both by the terminal and the current serving system and which it expects to be adequate for the concerned terminal.

2. Network control for system mode reselection when required to serve any specific service Several proposals have been made to allow the terminal to select the serving system according to the service the terminal (user) is requesting at each moment. A terminal based system mode selection has several serious disadvantages. Examples of the disadvantages are that:

The terminal is not in advance aware which service is best supported by each alternative system.

The terminal is not aware of the load of the alternative system, and then it may be that the alternative system is not at all able to serve the terminal, even with a lower quality of service, while the original system could have been able to serve the terminal with a compromise on quality of service.

System mode changes generate normally significant signalling load that should be avoided when possible.

System mode changes normally result to short gaps where the MS is unreachable from any of the locally available systems.

Clearly it is strongly preferable that the terminal operates on the system where a multimode network has put the terminal with different network and cell reselection parameters. The terminal should continue signalling through the serving system as normally and the control for system selection should be left for the multimode network. The solution to maintain full control at the multimode network while still making it possible for the terminal to be served with a service it wants and which it only supports on a non-serving system mode, or that is only supported by a non-serving system, can be reached by a generic service request procedure that allows the terminal to request a service that it supports under any of the supported system modes, and the generic service request can be sent to the serving network, at lest if indicated being allowed by the serving network.

DETAILED DESCRIPTION OF THE FIGURES

FIG. 1 is an example of a possible multimode system; this invention is not limited to this example case only. The multimode terminal supports all the access networks but is attached to one of the access networks based on cell selection criteria. Different access networks may have different set of services supported as well as the multimode terminal may support different set of services which may not be aligned with supported services in the access networks. For example possible access networks could be GSM/EDGE, WCDMA, CDMA2000, WLAN, BT, etc.

Figure 2:
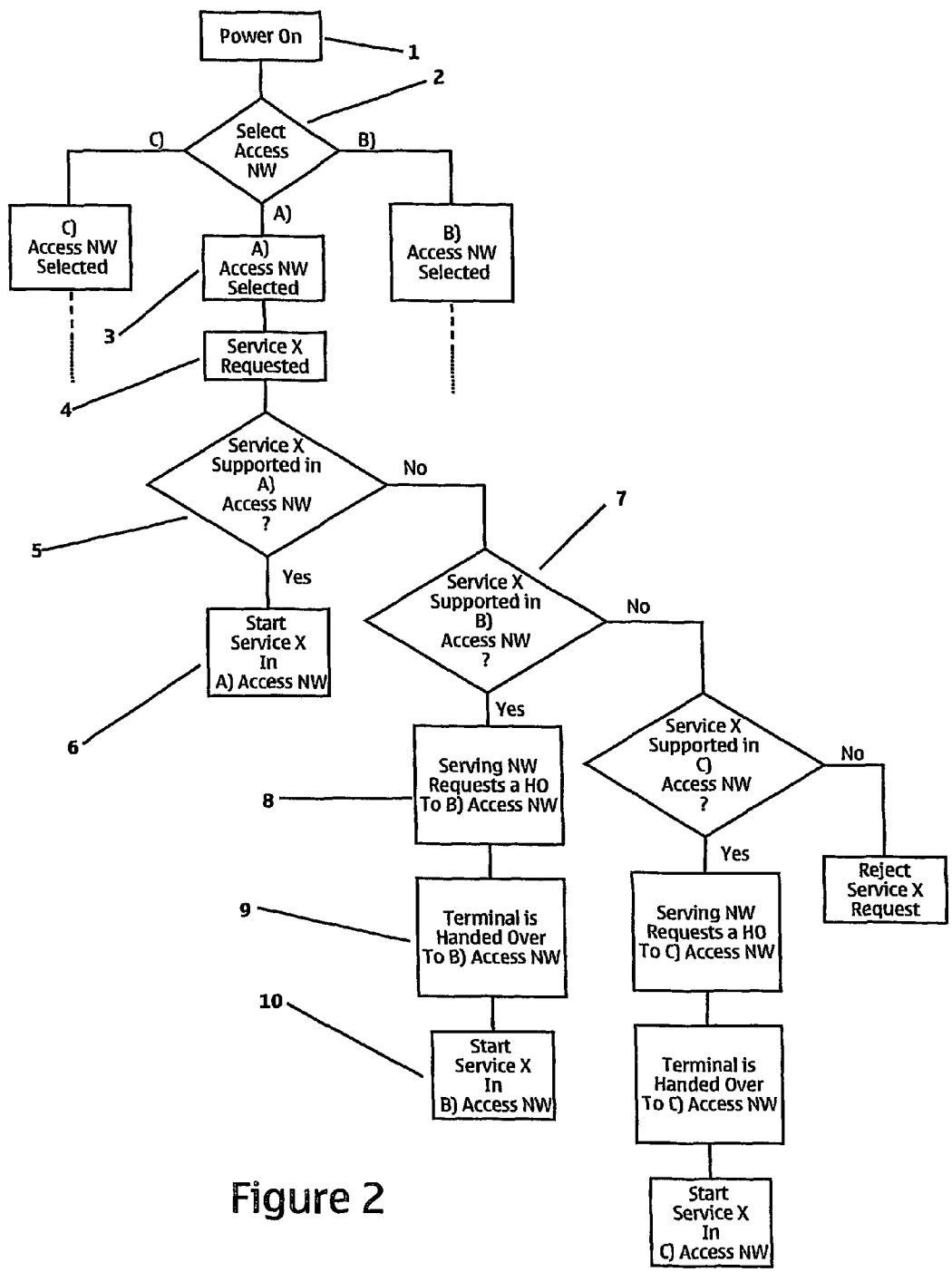
FIG. 2 shows a flow diagram where the multimode terminal is attached to access network A and the service X is requested.

The flow diagram of FIG. 2 shows that the requested service is established in the current access network or in alternative access network based on the multimode terminal and the access network capabilities in different modes. Similar flow diagrams are valid if the multimode terminal is attached to other access networks. The multimode terminal is first switched on (1). The multimode terminal then selects (2) and attaches (3) to one of multiple available access networks, in this example the multimode terminal selects access network A. Service X is then requested on access network A (4), where the service X is supported by the multimode terminal in at least one of the multiple modes supported by the multimode terminal and where the service is requested independently of the support for that service by access network A or the multimode terminal in the mode supported by access network A. The serving network then decides (5) either to establish the service in the current mode (6) or decides to move the multimode terminal to another access network. If the service can be established at access network B (7), the serving network requests a handover to access network B (8), the terminal is handed over to access network B (9) and the service is established (10).

The invention claimed is:

1. A method of operating a multimode terminal configured to support a plurality of modes in a multimode communication system, wherein each mode of the plurality of modes uses a different radio access technology, the method comprising:
sending service request signalling, from the multimode terminal to a first network node of a first radio access network connected to a core network and operating according to a first radio access technology, the first network node being configured to serve the multimode terminal and support operation of the multimode terminal in a first mode of the plurality of modes;
wherein the service request signalling is configured to request a service supported in at least one of the plurality of modes of the multimode terminal by including an identifier enabling the first network node to direct the service request to the second network node, the requested service being unsupported by the multimode terminal when operating in the first mode; and
receiving the requested service from a second network node of a second radio access network connected to the core network and operating according to a second radio access technology, the second network node supporting a second mode as a result of a handover of the multimode terminal from the first network node to the second network node, the requested service being supported by the multimode terminal when operating in the second mode.

2. A method according to claim 1, further comprising using one or more service request signalling messages that as such are used for services supported in the first mode, wherein one or more service request parameters in the messages indicate that a specific service is unsupported by the first network node or multimode terminal in the first mode and that the specific service is supported by the second network node and the multimode terminal operating in the second mode.

3. A method according to claim 1, wherein the service request signalling is triggered by a multimode terminal originated service establishment request.

4. A method according to claim 1, wherein the service request signalling is triggered by a system originated service establishment request.

5. A method according to claim 1, wherein the handover is initiated in response to a determination that the service is unsupported by the multimode terminal when operating in the first mode and the service is supported by the multimode terminal when operating in the second mode.

6. A method according to claim 1, wherein the handover is initiated in response to a determination that the service is unsupported by the first network node and the service is supported by the second network node.

7. A multimode terminal configured to support a plurality of modes in a multimode communication system, wherein each mode of the plurality of modes uses a different radio access technology, the multimode terminal comprising:
a transmitter configured to send service request signalling to a first network node of a first radio access network connected to a core network and operating according to a first radio access technology, wherein the first network node is configured to serve the multimode terminal and support operation of the multimode terminal in a first mode of the plurality of modes;
wherein the service request signalling is configured to request a service in at least one of the plurality of modes supported by the multimode terminal by including an identifier enabling the first network node to direct the service request to the second network node, the requested service being unsupported by the multimode terminal when operating in the first mode; and
a receiver configured to receive the requested service from a second network node of a second radio access network connected to the core network and operating according to a second radio access technology, the second network node supporting a second mode as a result of a handover of the multimode terminal from the first network node to the second network node, the requested service is supported by the multimode terminal when operating in the second mode.

8. A multimode terminal according to claim 7, where the multimode terminal is configured to use one or more service request signalling messages that as such are used for services supported in the first mode, the messages comprising one or more service request parameters indicating that a specific service is unsupported by the multimode terminal and first network node in the first mode and that the specific service is supported by the second network node operating in the second mode.

9. A method for providing a service in a multimode communication system supporting at least a first mode and a second mode, wherein each mode uses a different radio access technology, the method comprising:
receiving, by a first network node of a first radio access network connected to a core network and operating according to a first radio access technology, a service request for a service in the first mode from a multimode terminal supporting at least the first mode and the second mode, the service request including an identifier enabling the first network node to direct the service request to the second network node;

deciding, based on the service request, whether the requested service is supported by the multimode communication system when operating in the first mode or the second mode; and switching the multimode terminal to the second mode when it is decided that the requested service is not supported by the multimode terminal when operating in the first mode and is supported by the multimode terminal and the multimode communication system when operating in the second mode, wherein the second network node of a second radio access network connected to the core network and operating according to a second radio access technology supports the multimode terminal when operating in the second mode.

10. A method according to claim 9, further comprising receiving the service request from the multimode terminal using service request parameters that exceed capabilities of the multimode terminal in the first mode.

11. A multimode communication system supporting at least a first mode and a second mode, wherein each mode uses a different radio access technology, the system configured to:

receive, by a first network node of a first radio access network connected to a core network and operating according to a first radio access technology, a service request for a service in the first mode from a multimode terminal supporting at least the first mode and the second mode, the service request including an identifier enabling the first network node to direct the service request to a second network node;

decide, based on the service request, whether the requested service is supported by the multimode communication system when operating in the first mode or the second mode; and switch the multimode terminal to the second mode when it is decided that the requested service is not supported by the multimode terminal when operating in the first mode and is supported by the multimode terminal and the multimode communication system when operating in the second mode, wherein the second network node of a second radio access network connected to the core network and operating according to a second radio access technology supports the multimode terminal when operating in the second mode.

12. A method for receiving a service in a multimode communication system supporting at least a first mode and a second mode, wherein each mode uses a different radio access technology by a multimode terminal supporting at least the first mode and the second mode, the method comprising:

sending from the multimode terminal, to a first network node of a first radio access network connected to a core network and operating according to a first radio access technology, a service request for a service to the multimode communication system in the first mode, the service request including an identifier enabling the first network node to direct the service request to a second network node, wherein the requested service is unsupported by the multimode terminal when operating in the first mode; and switching the multimode terminal to the second mode when the multimode communication system finds the service is not supported by the multimode terminal when operating in the first mode and is supported by the multimode terminal and the multimode communication system when operating in the second mode, wherein the second network node of a second radio access network connected to the core network and operating according to a second radio access technology supports the multimode terminal when operating in the second mode.

13. A multimode terminal supporting at least a first mode and a second mode, wherein each mode uses a different radio access technology, the terminal configured to receive a service in a multimode communication system supporting at least the first mode and the second mode, the terminal further configured to:

send, to a first network node of a first radio access network connected to a core network and operating according to a first radio access technology, a service request for a service to the multimode communication system in the first mode, the service request including an identifier enabling the first network node to direct the service request to the second network node, wherein the requested service is unsupported by the multimode terminal when operating in the first mode; and switch the multimode terminal to the second mode when the multimode communication system finds the service is not supported by the multimode terminal when operating in the first mode and is supported by the multimode terminal and the multimode communication system when operating in the second mode, wherein a second network node of a second radio access network connected to the core network and operating according to a second radio access technology supports the multimode terminal when operating in the second mode.

* * * * *